US012493332B2

(12) United States Patent
Huber

(10) Patent No.: US 12,493,332 B2
(45) Date of Patent: Dec. 9, 2025

(54) CPU COOLER CONTACT FRAME AND METHOD FOR INSTALLING A COOLER ONTO A CPU USING THE SAME

(71) Applicant: ARCTIC (HK) Ltd., Hong Kong (HK)

(72) Inventor: Magnus Huber, Hong Kong (HK)

(73) Assignee: ARCTIC (HK) Limited, Hong Kong (HK)

( * ) Notice: Subject to any disclaimer, the term of this patent is extended or adjusted under 35 U.S.C. 154(b) by 141 days.

(21) Appl. No.: 18/407,983

(22) Filed: Jan. 9, 2024

(65) Prior Publication Data

US 2025/0224783 A1    Jul. 10, 2025

(51) Int. Cl.
  *G06F 1/20*   (2006.01)
  *H05K 7/20*   (2006.01)

(52) U.S. Cl.
  CPC ........... *G06F 1/20* (2013.01); *H05K 7/20254* (2013.01)

(58) Field of Classification Search
  CPC ........... G06F 1/20; G06F 1/203; G06F 1/206; H05K 7/20254
  See application file for complete search history.

(56) References Cited

U.S. PATENT DOCUMENTS

| | | | |
|---|---|---|---|
| 6,477,058 B1 * | 11/2002 | Luebs | H05K 7/1061 361/764 |
| 10,638,629 B2 * | 4/2020 | Thompson | H05K 1/114 |
| 11,191,187 B2 * | 11/2021 | Schmit | H05K 1/0203 |
| 12,222,776 B1 * | 2/2025 | Elashri | G06F 1/20 |
| 2013/0163207 A1 * | 6/2013 | Chen | H01L 23/4006 361/720 |
| 2013/0340973 A1 * | 12/2013 | Zhou | H01L 23/4006 165/80.1 |
| 2025/0081391 A1 * | 3/2025 | Zhao | H05K 7/20263 |
| 2025/0138606 A1 * | 5/2025 | Wang | G06F 1/20 |
| 2025/0203825 A1 * | 6/2025 | Boyd | F28F 3/12 |
| 2025/0212362 A1 * | 6/2025 | Cacho Alonso | H05K 7/20309 |

* cited by examiner

*Primary Examiner* — Nelson J Nieves
(74) *Attorney, Agent, or Firm* — Tollefson IP

(57) ABSTRACT

A cooler contact frame is provided which replaces an ILM for both installing a CPU into a socket and as a mount for CPU cooler installation. According to embodiments of the present invention, the contact frame is provided with two mounting nuts on either side (depending on the heatsink design whether a mounting bar positioned in the East-West or North-South direction is more suitable) to fix the CPU cooler on it. The new and improved cooler contact frame eliminates the clips, spacers, and fasteners between the clips and mainboard and the backplate required by the prior art. Further, the invented cooler contact frame is more straightforward to install and makes cooler installation less complex.

18 Claims, 11 Drawing Sheets

CPU COOLER CONTACT FRAME AND METHOD FOR INSTALLING A COOLER ONTO A CPU USING THE SAME

BACKGROUND OF THE INVENTION

Field of the Invention

The present disclosure relates generally systems and methods for attaching a cooler to a computer chip, such as a CPU. More particularly, the present invention relates to a novel CPU cooler contact frame for securely attach a cooler to a CPU socket on a computer motherboard, and method of securing the cooler to the CPU socket.

Description of the Related Art

Typical computer systems include heat-generating components that require cooling. Central processing units (CPUs) and graphics processing units (GPUs) are the most common heat generating electrical components in a computing device. Computer cooling systems are used to remove the waste heat produced by CPUs and GPUs and other heat generating computer components.

Computer coolers typically have a cold plate as a bottom surface which contacts a computer chip for transfer of heat away from the computer chip, most commonly, to a fluid pumped through a reservoir or heat exchanger. An example of such a cooler is shown and described in U.S. Pat. No. 10,524,386, titled WATER COOLER ASSEMBLY AND SYSTEM, the entire contents of each of which are hereby incorporated herein by reference.

Certain computer chip manufacturers provide or require mounting hardware to mount or install chips and components onto a printed circuit board (PCB). For example, INTEL CORP requires an integrated loading mechanism (ILM) to securely install a CPU to an INTEL CPU socket on a motherboard.

FIG. 1A shows an INTEL Intel socket LGA1700 consists of a plastic housing 100 holding 1700 pins 101. The pins make contact to corresponding pads at the bottom of the CPU. Shown in FIG. 1A, an open ILM 102 surrounding the socket 100. FIG. 1B shows an INTEL CPU 104 for the socket 1700. The CPU 104 consists of 3 basic components: the PCB (printed circuit board) 106, the DIE (the silicon containing the integrated circuit) 108 and an Internal Heat Spreader (IHS) 110, typically a conductive plate, such as a nickel-plated copper plate. The ILM 102 when closed applies force to the IHS 110 of the CPU 104 to install the CPU 104 into the socket 100.

FIG. 2A shows a top view of an ILM 102 closed onto a CPU 104. In FIG. 2A, a "keep-out zone" is defined. This shows the mainboard manufacturer the maximum component height in the 95×95 mm area of the CPU. Below these heights are shown in the form of a volume body (202).

The ILM 102 consists of 4 parts, 3 made of sheet metal (204, 206 and 208) as well as the leaver wire to close it (210). ILM 102 presses onto the CPU IHS at two points. Its tremendous compression charge deforms the IHS (110 under 206) into a slightly concave shape. The 4 214 holes in the outer areas of the 95×95 mm zone are for the mounting of a CPU Cooler.

As shown in FIG. 2B, below the motherboard, a steel plate 216 is provided and the ILM 102 is fixed onto it by 4 screws. This plate 216 stiffens the mainboard and prevents it from excessive bending.

The ILM is mounted on the motherboard over the CPU to both hold the CPU in place in the socket and to provide a mounting facility for a cooler. The surface of the IHS curves concavely due to the resulting uneven contact pressure by the ILM on the CPU processor into the socket. As a result, when a CPU cooler is installed, the base plate of the cooler rests primarily on the edges of the IHS, creating a thermal "hotspot" in the center of the CPU where the base plate of the cooler does not make good contact.

Solutions proposed to eliminate the hotspot include adding an inner contour to shift the contact pressure from the center of the CPU to the edges during assembly. However, deformation along the North-South axis and the East-West axis are not the same. Thus even with machining, there is no perfect contact between the cooler and the IHS.

Another solution was to replace the ILM by a contact frame which holds the CPU in place and presses it with more or less force into the socket in order to try to reduce warping. The contact frames existing in the market do not provide a mounting solution for a CPU cooler. As a result, the CPU cooler must be fixed onto the mainboard through 4 holes in the outer region over the contact frame similar to mounting over an ILM. This deforms the mainboard and limits the CPU cooler's weight and compression charge on the CPU; both limited cooling performance. A second backing plate may be added below the back plate to reduce deformation of the motherboard. This solution may prevent the IHS from deforming but adds additional parts which drive up the expense and complexity of cooler installation. In order to fix a heatsink or cooler through the 4 holes on the mainboard, besides the backplate, there are two clips needed. See FIG. 3 (clips 302).

Thus, there is a need for a new and improved cooler contact frame that eliminates thermal hot spots and reduces the problems in the prior art with thermal hotspots, and the expense and complexity of cooler installation.

SUMMARY OF THE INVENTION

According to embodiments of the present invention, a cooler contact frame is provided which replaces an ILM for both installing a CPU into a socket and as a mount for CPU cooler installation. According to embodiments of the present invention, the contact frame is provided with two mounting nuts on either side (depending on the heatsink design whether a mounting bar positioned in the East-West or North-South direction is more suitable) to fix the CPU cooler on it. The new and improved cooler contact frame eliminates the clips, spacers, and fasteners between the clips and mainboard and the backplate required by the prior art. Further, the invented cooler contact frame is more straightforward to install and makes cooler installation less complex.

According to embodiments of the present invention, the cooler contact frame can be made of plastic or any metal, as long as it is sufficiently stiff. If the CPU cooler to be installed allows a mounting bar oriented North-South, the fasteners (e.g., nuts) can be located almost perfectly in between the ILM mounting and thus generate little stress in the contact frame.

According to embodiments of the present invention, the CPU cooler to be installed allows a mounting bar oriented East-West direction. According to this embodiment, the frame includes raised opposing portions in the East and West regions which may be cantilevered out over keep-out zones, to provide cooler mounting regions for a mounting bracket.

According to some embodiments, the contact frame has a solid frame body with a substantially rectangular (including square) aperture, generally in the center of the frame, for receiving the body of a CPU. The frame has opposed top surface sections that are of a height less than the top surface of the CPU (e.g., the IHS), thereby allowing a cooler coldplate to rest directly on top of the IHS of a CPU. The contact frame includes four openings positioned correspondingly with pre-existing screw holes in a motherboard for mounting an ILM, thereby allowing the contact frame to be mounted in the same position of an ILM. The contact frame also includes two opposing raised portions having a top surface higher than the top surface of the CPU, each raised portion having a threaded opening for receiving a fastener. The raise portions creating a mounting area for a CPU cooler over the CPU positioned within the aperture of the frame. The contact frame has opposed bottom surfaces within an edge region of the aperture for contacting with an edge surface of the CPU to apply force onto the CPU to mount a CPU in a socket on the motherboard.

According to some embodiments, the contact frame has a solid frame body with a substantially rectangular (including square) aperture, generally in the center of the frame, for receiving the body of a CPU. The frame has opposed top surface sections that are of a height less than the top surface of the CPU (e.g., the IHS), thereby allowing a cooler coldplate to rest directly on top of the IHS of a CPU. The contact frame includes four openings positioned correspondingly with pre-existing screw holes in a motherboard for mounting an ILM, thereby allowing the contact frame to be mounted in the same position of an ILM. The contact frame also includes two opposing portions having a threaded opening for receiving a fastener. The opposed portions creating a mounting area for a CPU cooler.

According to some embodiments, the contact frame has a solid frame body constructed of a single piece. For example, the contact frame could be injection molded or cast as a single piece. According to other embodiments, the contact frame could be constructed of two pieces. According to some embodiment, a first piece can have a shape like the contact frame described herein, but with larger aperture and inside this aperture one may use an adapter frame to hold the CPU in position.

BRIEF DESCRIPTION OF DRAWINGS

Embodiments of the present invention are illustrated by way of example with reference to the accompanying drawings, which should not be construed to limit the present disclosure.

DETAILED DESCRIPTION OF THE PREFERRED EMBODIMENTS

The following descriptions are presented to enable any person skilled in the art to create and use apparatuses, systems and methods described herein.

Figure 1A:
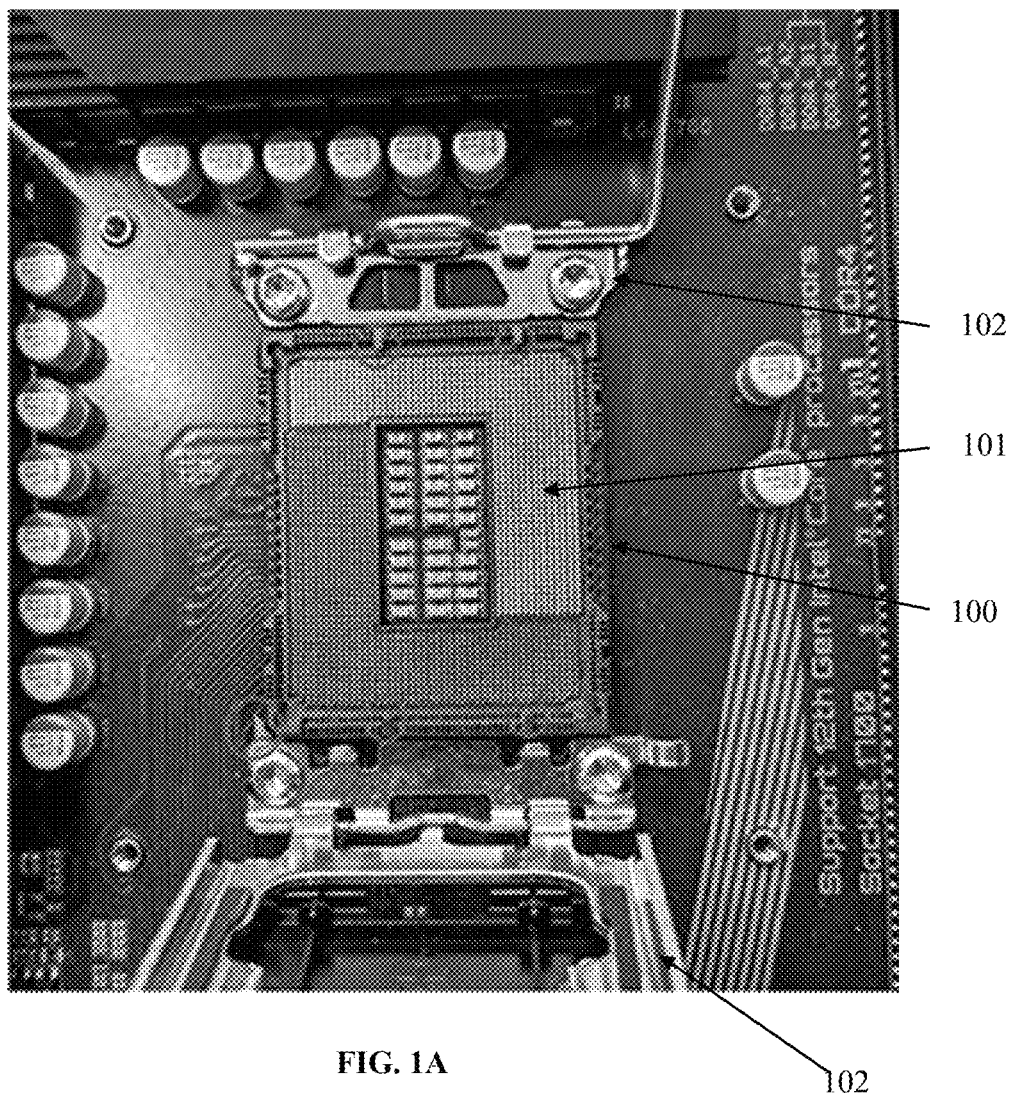
FIGS. 1A and 1B illustrates an existing CPU socket with an ILM, and a CPU to be installed therein.
Figure 1B:
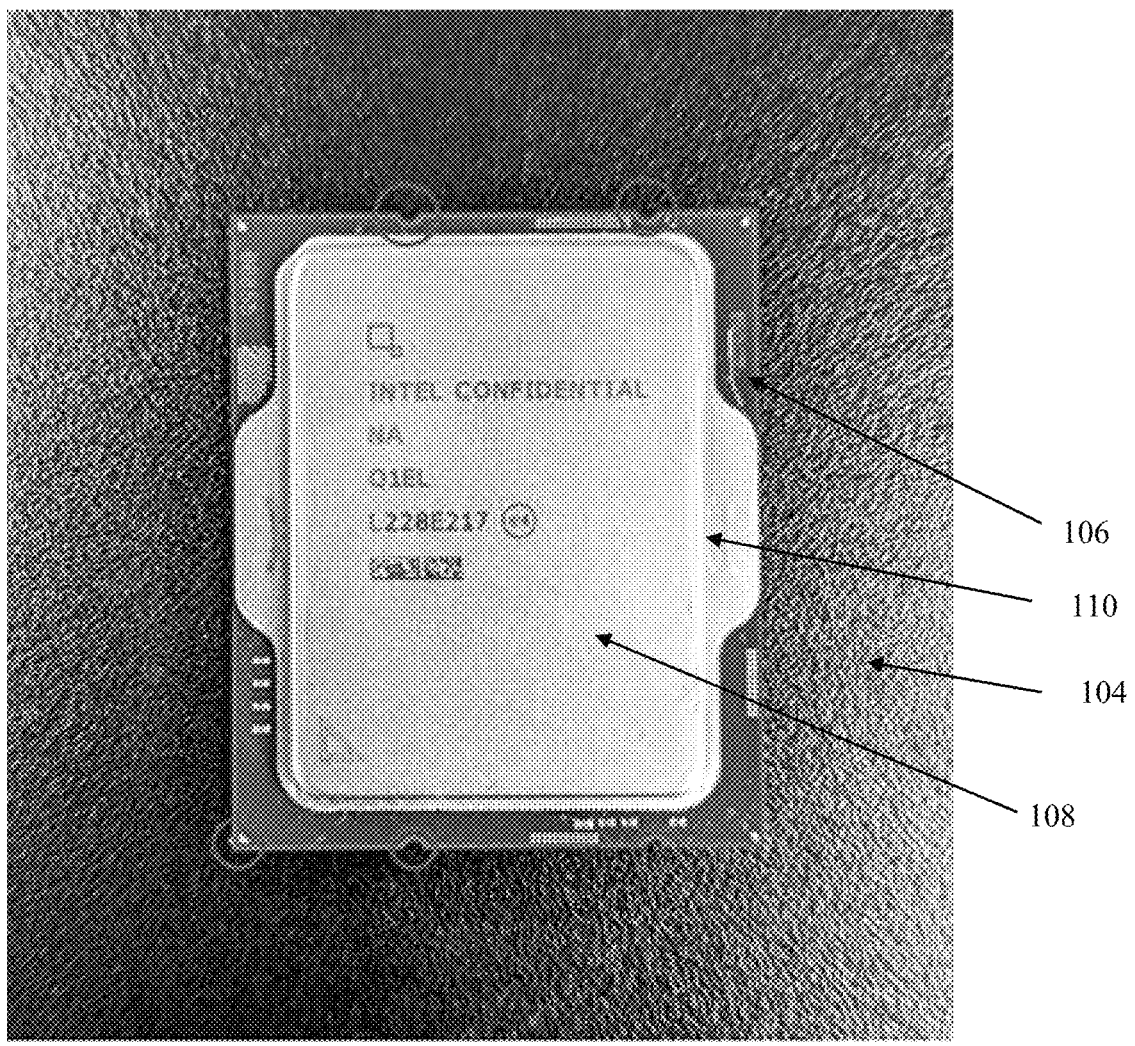
Figure 2A:
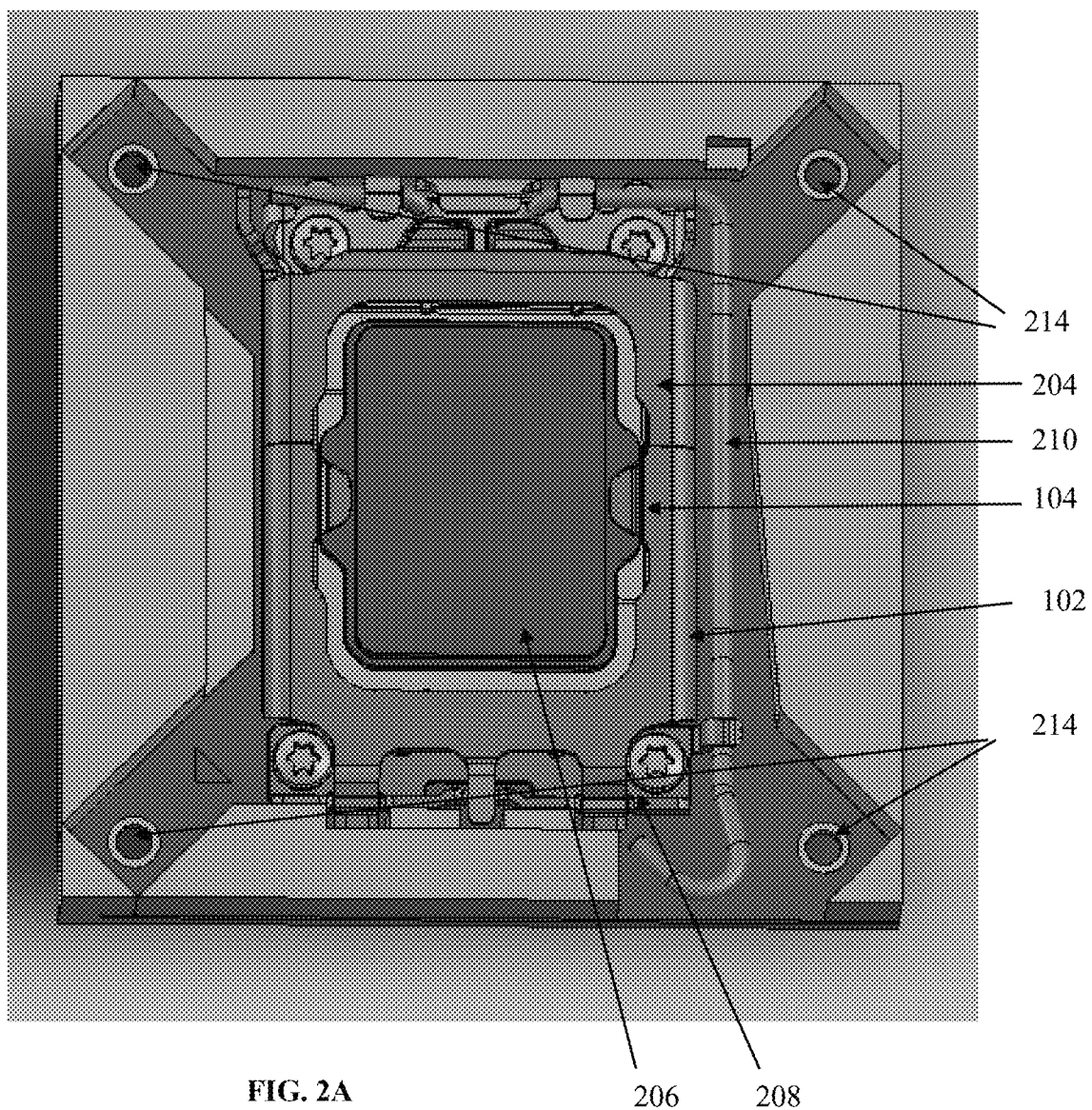
FIGS. 2A and 2B are top and bottom views of an existing ILM.
Figure 2B:
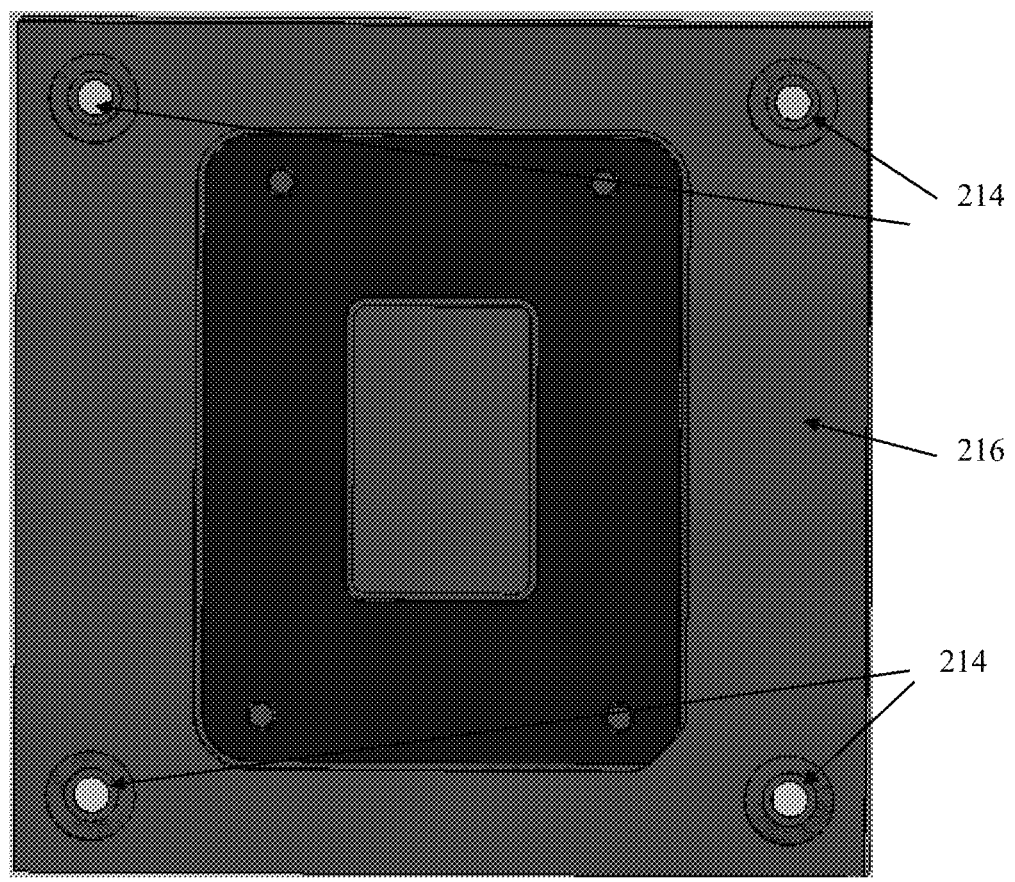
Figure 3:
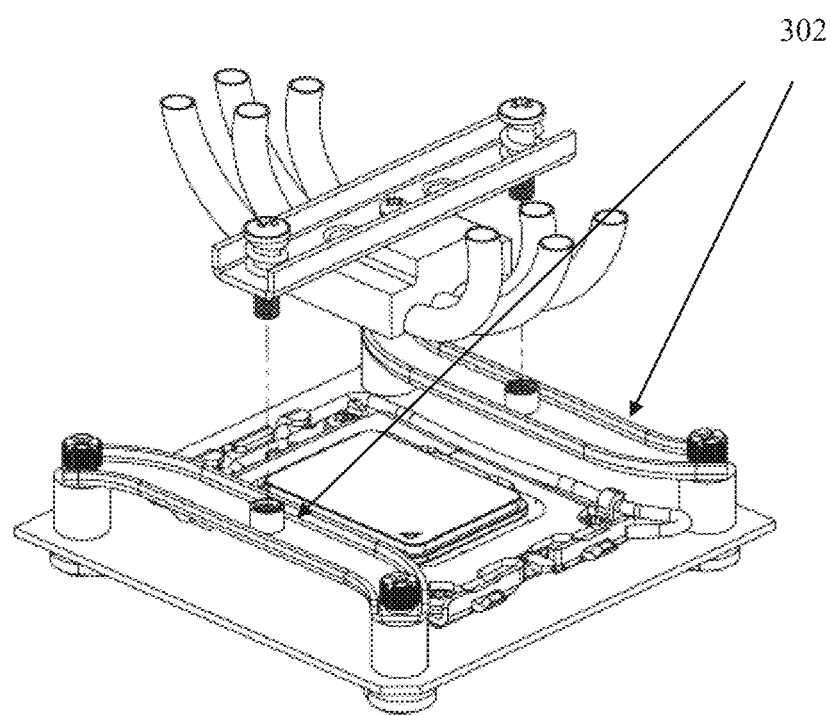
FIG. 3 illustrates a cooler installation over an ILM using clips.
Figure 4A:
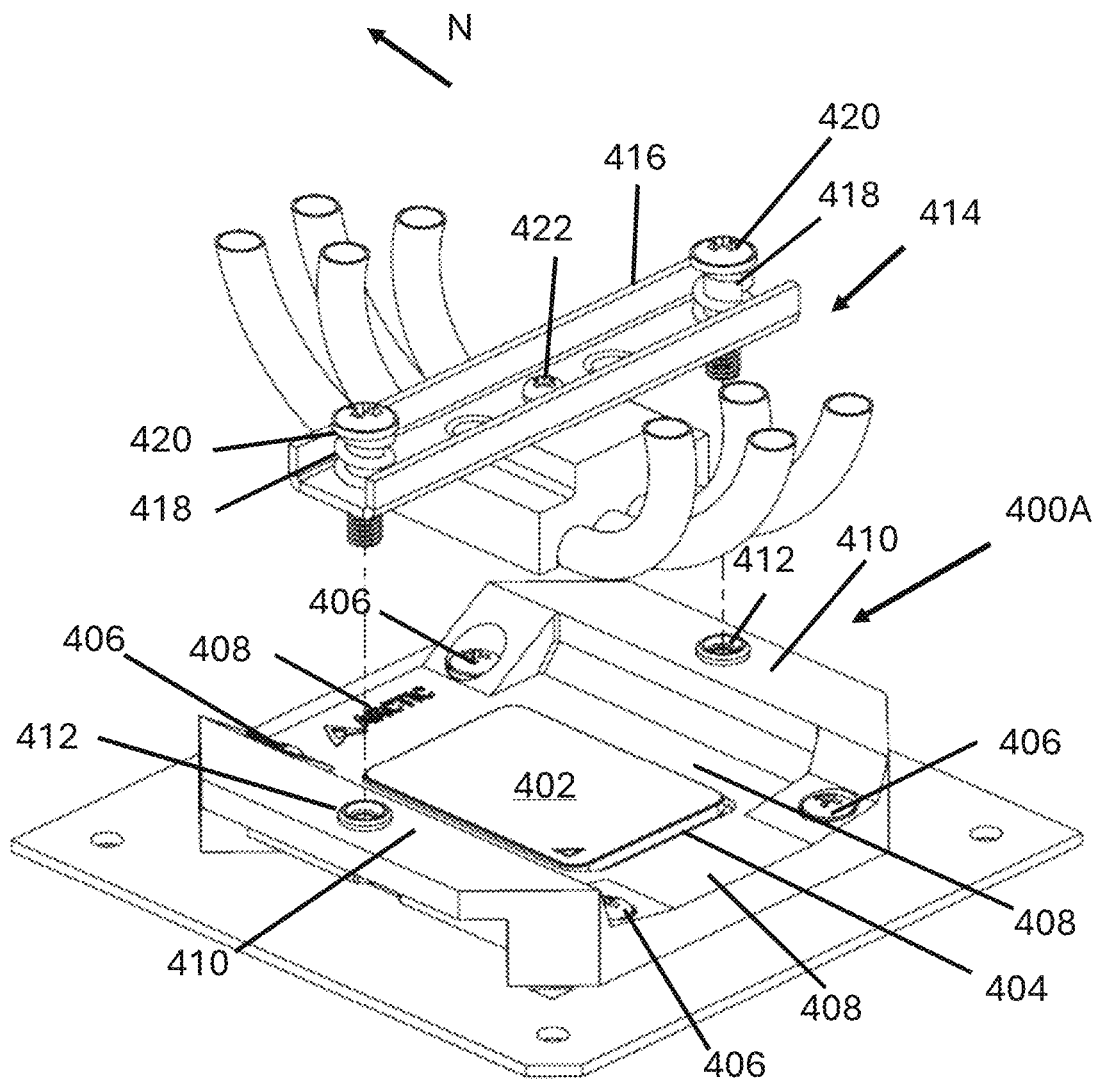
FIG. 4A is a perspective view of a cooler contact frame installed over a CPU according to an embodiment of the present invention.

FIG. 4A is a perspective view of a cooler contact frame installed over a CPU according to an embodiment of the present invention. Frame 400A as shown has a generally rectangular shape adapted to surround a CPU 402 (the top surface being the IHS). Therefore, the fame include an aperture 404 through the frame larger than the size of the CPU. A bottom surface of the frame (not shown), in an edge region, contacts with an edge surface of the CPU (e.g., the PCB portion of the CPU) to press the CPU into the socket to engage with the electrical connections of the socket. In this manner, the frame 400 can perform the function of the ILM.

Frame 400 includes openings 406 for allowing fasteners (e.g., screws or bolts) to pass therethrough for fastening to a motherboard and/or PCB. The openings are positioned to line up with a manufacturer's provided fastening regions for an ILM. The frame 400A includes top surfaces 408 that are lower in height than the top surface (e.g., the IHS 402) of a CPU 402 installed under the frame 400A and positioned in the frame aperture 404. This creates a contact region for a CPU cooler 414 so that a cooler plate may be fitted directly onto the top surface of the IHS of the CPU 402. The frame 400A further includes a mounting region including opposing raised regions 410 outside of the contact region, each with a fastening arrangement. As shown, threaded opening 412 may be provide in each raised region 410 for receiving a fastener such as a screw or bolt, for mounting a cooler 414 thereto. A clamp 416, springs 418 and screws 420 may be provided for clamping the cooler 414 onto the frame 400A to make contact with the CPU 402. An opening in the clamp 416 can be aligned with a threaded opening in the cooler 414 so that the claim can be secured to the cooler by a screw 422. The bottom of the CPU cooler 414 will rest on the IHS of the CPU 402, and springs 418 may be provide to ensure the proper amount of force is placed onto the CPU IHS 402.

Raised regions 410 are substantially thicker than regions 408 of frame 400A, and should be suitably stiff to support the weight of cooler 414.

Frame 400A is adapted to be installed with much lower pressure than the standard ILM since it presses on the ledge equally all around the CPU instead of on two points only, thus distributes the compression charge much better and will not deform the IHS of a CPU, so that the cold plate of a CPU cooler will have proper contact for cooling the CPU. As shown in FIG. 4A, the raised regions are in the areas east and west of CPU 402, but a mounting surface could be formed in the north and south regions as well. Further, a single threaded opening is provided in each raised region 410, other fastening arrangements are contemplated. The skilled person will understand that the size and weight of the cooler may require additional or different fastening arrangements. A single threaded opening keeps installation of a cooler simple and low cost.

Figure 4B:
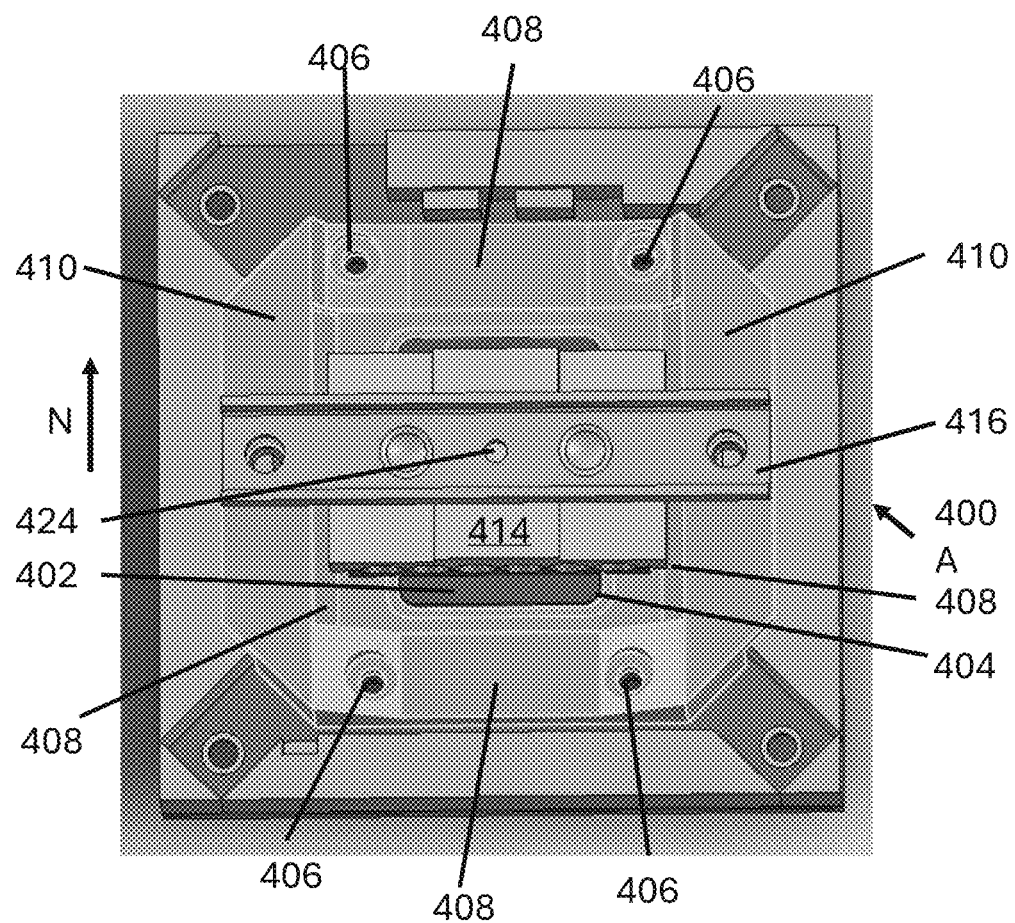
FIG. 4B is a top view of cooler contact frame installed over a CPU according to an embodiment of the present invention.

FIG. 4B is a top view of cooler contact frame 400A installed over a CPU according to an embodiment of the present invention. Frame 400A as shown has a generally rectangular shape adapted to surround a CPU 402. Therefore, the frame 400A includes aperture 404 through the frame smaller than the size of the CPU 402. The aperture is smaller than the CPU since it sits on the ledge of the Heat Spreader. A bottom surface of the frame (not shown), in an edge region, contacts with an edge surface of the heat spreader of CPU 402 to press the CPU 402 into the socket (not shown) to engage with the electrical connections of the socket. In this manner, the frame 400 performs the function of the ILM.

As shown, Frame 400 includes openings 406 for allowing fasteners (e.g., screws or bolts) to pass therethrough for fastening to a motherboard and/or PCB. The openings are positioned to line up with a manufacturer's provided fastening regions for an ILM. The frame 400 includes top surfaces 408 that are lower in height than the top surface (e.g., the IHS) of a CPU 402 installed under the frame 400A and positioned in the frame aperture 404. This creates a mounting region for a cooler so that a cooler plate may be fitted directly onto the IHS of the CPU 402. The frame further includes opposing raised regions 410 outside of the mounting region each with a threaded opening 412 for receiving a fastener such as a screw or bolt, for mounting a cooler 414 thereto. A clamp 416, springs 418 and screws 420 may be provided for clamping the cooler 414 onto the frame. Springs 418 may be provide to ensure the proper amount of force is placed onto the CPU IHS 402. Clamp 416 may include an opening 424 through which a fastener, such as a screw, may be used to secure the clamp 416 to the cooler 414.

Figure 4C:
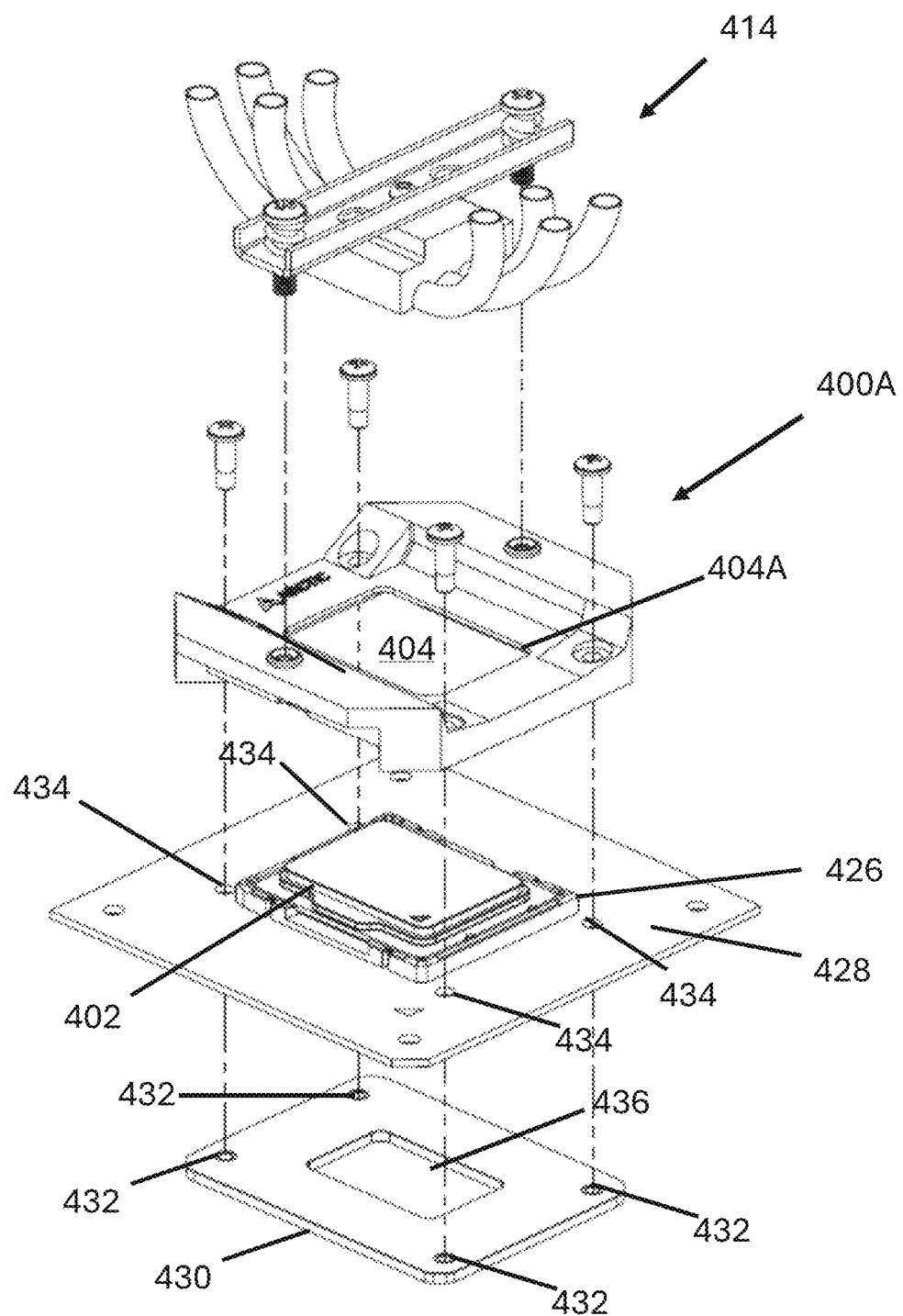
FIG. 4C is an expanded perspective view of the frame being installed onto a CPU 402 according to embodiments of the present invention.

FIG. 4C is an expanded perspective view of the frame 400A being installed onto a CPU 402 into socket 426 on a motherboard 428, according to embodiments of the present invention. As shown, a backing plate 430 is provided below the motherboard 428 with openings 432 for receiving bolts or screws corresponding to openings 434 in the motherboard 428 for receiving an ILM. The backing plate 422 includes an aperture for reducing pressure on the CPU 602 and socket (under CPU 402). As shown, opening 406 are also aligned with openings 434 and 432. The openings 432 may be threaded to receive screws 420. As can be seen, the PCB portion 402A of CPU 402 is under the bottom surface of frame 400 in the edge area 404A of aperture 404.

Figure 4D:
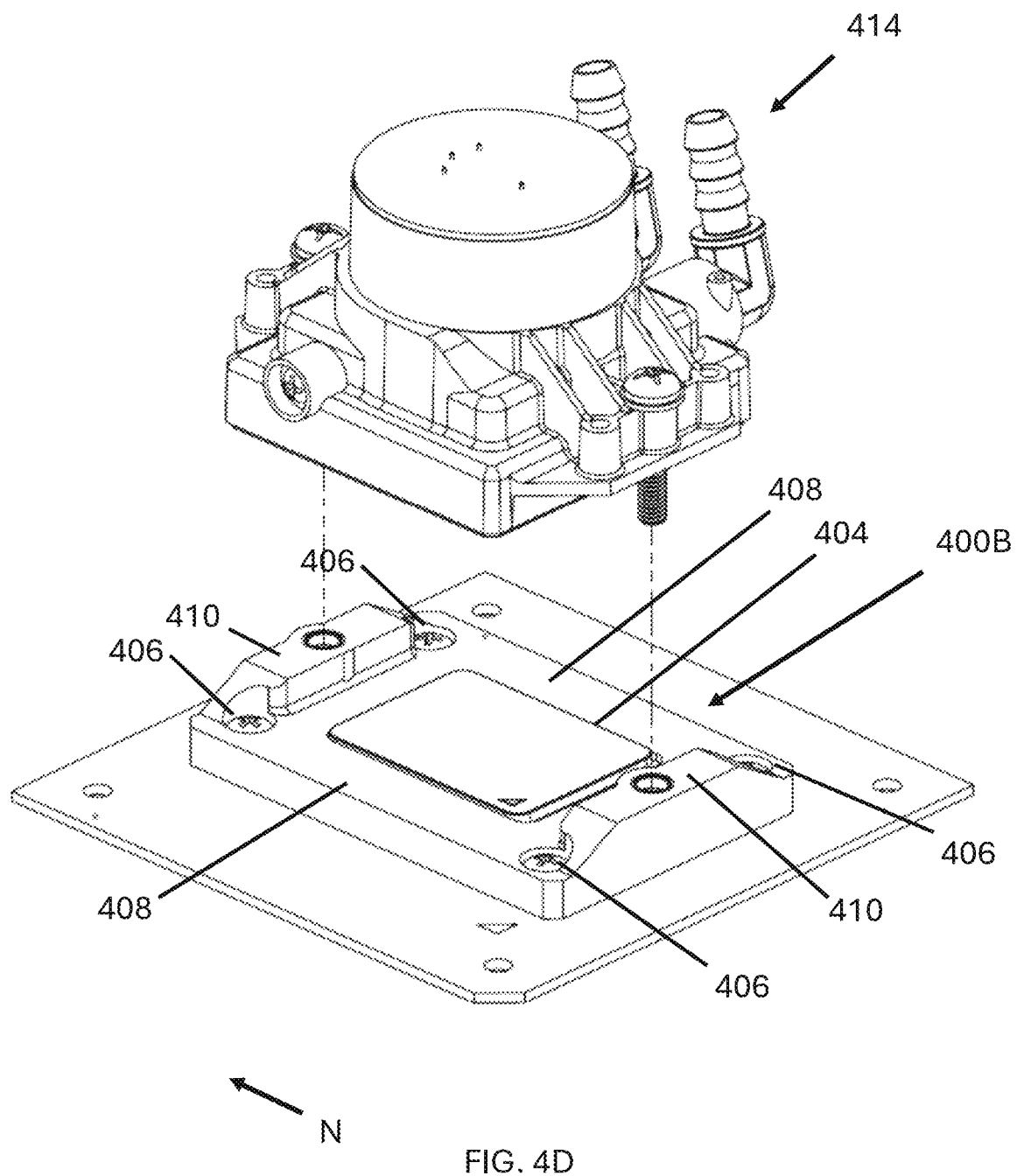
FIG. 4D is a perspective view of a cooler contact frame installed over a CPU according to another embodiment of the present invention.

FIG. 4D is a perspective view of a cooler contact frame 400B installed over a CPU according to an embodiment of the present invention. Frame 400B as shown has a generally rectangular shape adapted to surround a CPU 402 (the top surface being the IHS). Therefore, the frame 400A includes an aperture 404 through the frame larger than the size of the top of CPU 402. A bottom surface of the frame 400B (not shown), in an edge region, contacts with an edge surface of the CPU (e.g., the PCB portion of the CPU) to press the CPU 402 into the socket to engage with the electrical connections of the socket. In this manner, the frame 400B can perform the function of the ILM.

As shown, the frame 400B of this embodiment has a slightly different shape than frame 400A, in that the raised portions 410 are in the north and south sections, rather than the east and west as shown in FIG. 4A. In this example, the raised portions 410 need not be cantilevered because there are no height restrictions in the north and south areas of the motherboard near the CPU 402. Therefore, the raised sections may be solid, simplifying even further manufacture of the frame and installation of a cooler onto a CPU.

Like frame 400A, frame 400B includes openings 406 for allowing fasteners (e.g., screws or bolts) to pass therethrough for fastening to a motherboard and/or PCB. The openings 406 are positioned to line up with a manufacturer's provided fastening regions for an ILM. The frame 400B includes top surfaces 408 that are lower in height than the top surface (e.g., the IHS 402) of a CPU 402 installed under the frame 400B and positioned in the frame aperture 404. This creates a contact region for a CPU cooler 414 so that a cooler plate may be fitted directly onto the top surface of the IHS of the CPU 402. The frame 400B further includes opposing raised regions 410 outside of the contact region each with a threaded opening 412 for receiving a fastener such as a screw or bolt, for mounting a cooler 414 thereto. A clamp 416, springs 418 and screws 420 may be provided for clamping the cooler 414 onto the frame 400B to make contact with the CPU 402. An opening in the clamp 416 can be aligned with a threaded opening in the cooler 414 so that the claim can be secured to the cooler by a screw 422. The bottom of the CPU cooler 414 will rest on the IHS of the CPU 402, and springs 418 may be provide to ensure the proper amount of force is placed onto the CPU IHS 402.

Frame 400B is adapted to be installed with much lower pressure than the standard ILM and will not deform the IHS of a CPU, so that the cold plate of a CPU cooler will have proper contact for cooling the CPU. As shown in FIG. 4D, the raised regions are in the areas north and south of CPU 402, but a mounting surface could be formed in the east and west regions as well. Further, a single threaded opening is provided in each raised region 410, other fastening arrangements are contemplated. The skilled person will understand that the size and weight of the cooler may require additional or different fastening arrangements. A single threaded opening keeps installation of a cooler simple and low cost.

Figure 4E:
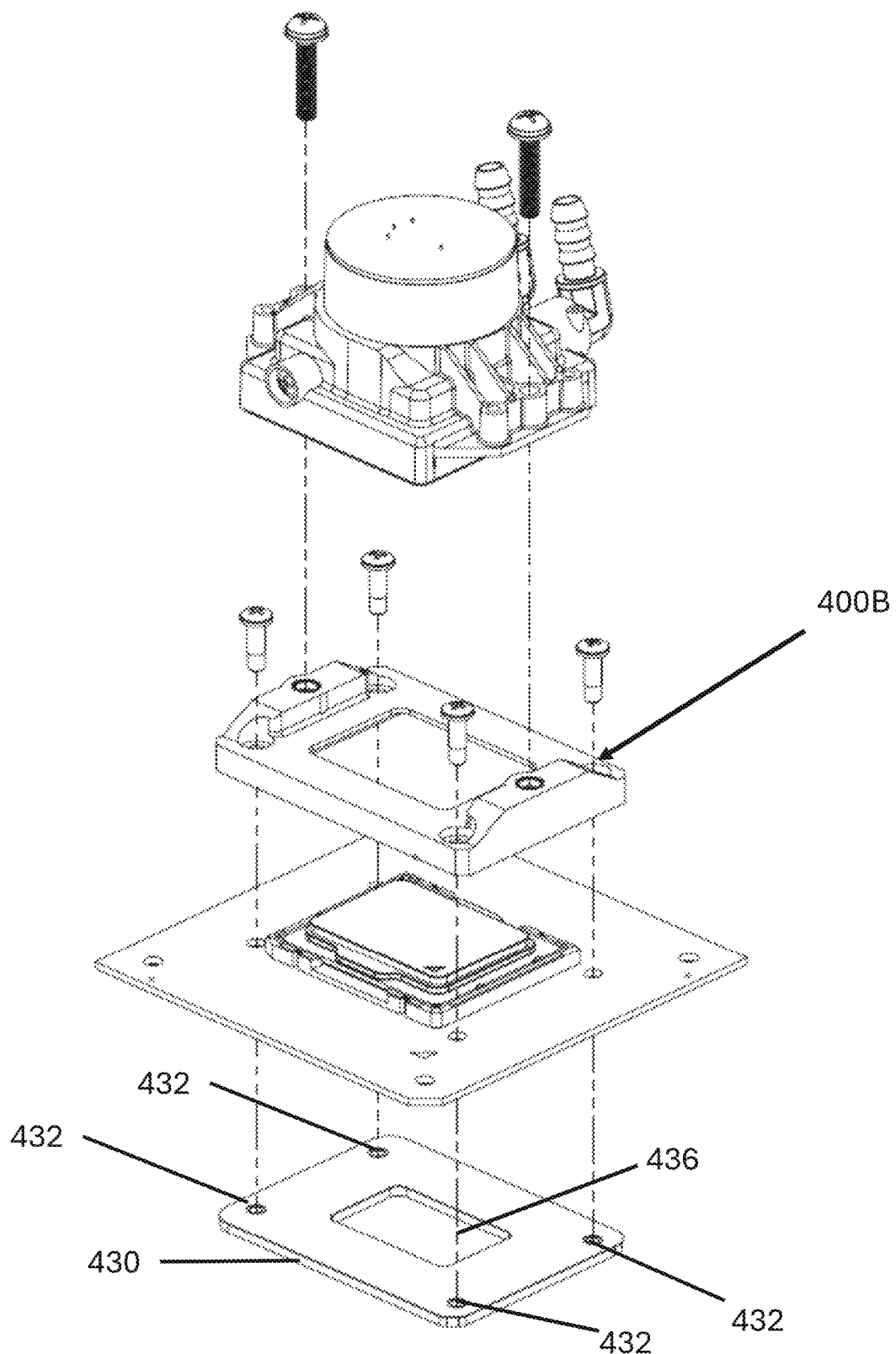
FIG. 4E is an expanded perspective view of the frame being installed onto a CPU 402 according to embodiments of the present invention.

FIG. 4E is an expanded perspective view of the frame 400B being installed onto a CPU 402 into socket 426 on a motherboard 428, according to embodiments of the present invention. As shown, a backing plate 430 is provided below the motherboard 428 with openings 432 for receiving bolts or screws corresponding to openings 434 in the motherboard 428 for receiving an ILM. The backing plate 422 includes an aperture 436 to allow components at the back side of the mainboard. As shown, opening 406 are also aligned with openings 434 and 432. The openings 432 may be threaded to receive screws 420. As can be seen, the PCB portion 402A of CPU 402 is under the bottom surface of frame 400 in the edge area 404A of aperture 404.

Figure 5:
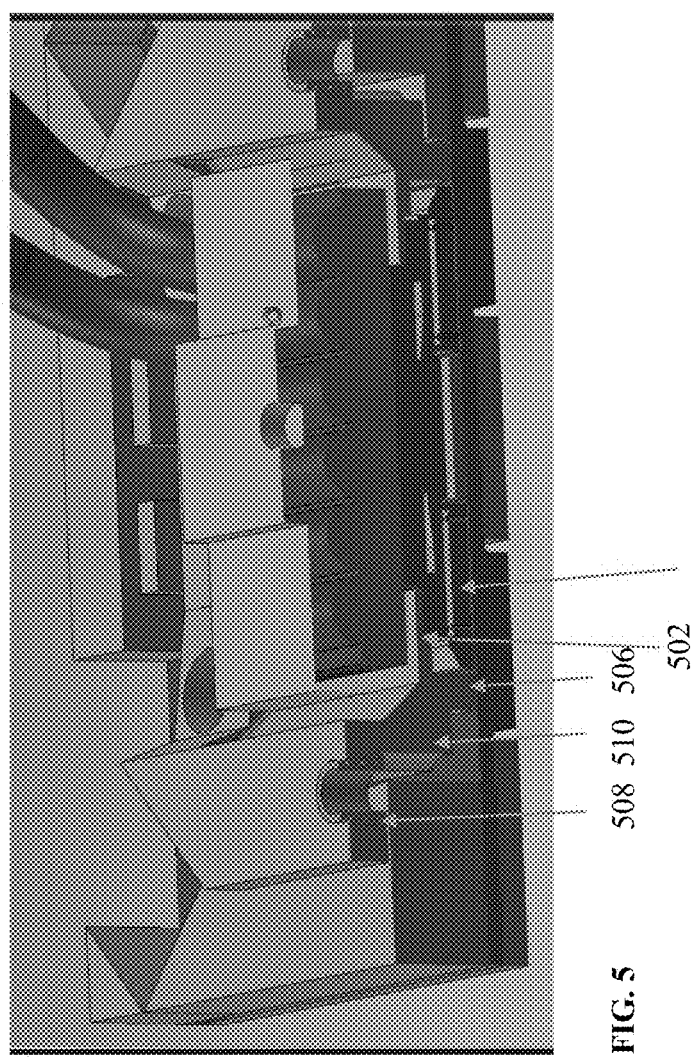
FIG. 5 is a cross sectional views of the frame showing a raised mounting portion, according to an embodiment of the present invention.

FIG. 5 is a cross section of the contact frame 400A of FIGS. 4A-4C in the North direction, through the center of opening 412. As shown in FIG. 5, the frame is formed to have contacting surfaces 502 for applying a downward force on the PCB 504 of the CPU. The downward force may be limited by using a dampening device, such as a spring (not shown), and/or by the shape of the frame. Frame 400A also include portion 506 for making contact with the motherboard and a cantilevered raised portion 508, which projects away from the aperture in the middle of the frame (i.e., in the east or west direction), to form a raised mounting surface for a cooler. The cantilevered design allows the frame to project out and over the motherboard and components that may be installed in the area east and west of the CPU. Of course, if no components are to be installed in these areas, the mounting portion may be solid and contact with the motherboard. As shown, in the region of portion 510, the shape of the frame is of greater thickness than in the cantilevered portion and is adapted to provide stiffness to support the cantilevered portion. According to this arrangement, the frame 400A is able to install the CPU 402 into the socket and provide a mounting region without violating any keep out regulations and allows for components to be installed on the motherboard in the east and west regions near the CPU 402.

The contact frame of the present invention is preferably a single integrated piece, and may be manufactured from appropriate metals or plastics by known processes including molding, metal injection molding, die casting, forging, sand blasting, etching, etc. The frame can be sized and shaped based on the corresponding CPU chipset to be installed. The Contact Frame comes with an aperture for a socket 1700 CPU of about 28.7×38.7 mm. The aperture for future socket may vary. The Contact Frame is ideally produced by fiber reinforced plastic injection or a casted metal. The aperture is only there to hold the CPU in position until the CPU cooler presses it into the socket.

In accordance with embodiments of the present invention, an ILM may be replaced with the invented contact frame, which installs a CPU into the motherboard socket without warping the CPU or IHS, and further provides mounting surfaces for a cooler, thereby eliminating the need for extra parts or complex installation. As shown in FIG. 4A, a frame with raised installation regions on the east and west side of the CPU may be installed in the location where an ILM is normally installed. A cooler then can be secured simply and easily directly onto the frame using a single bracket and fasteners such as screws. By providing a frame of the shape showing in FIG. 4A, the cooler coldplate makes good direct contact with the top surface of the CPU (i.e., the IHS). Dampeners may be added to the fasteners securing the frame to the motherboard in order to prevent over-torqueing and to control the amount of force a bottom contacting surface of the frame applies to the CPU.

Likewise, as shown in FIGS. 4D-E, a frame may be provided with a raised installation regions in the north and south areas of the CPU, which may improve the stiffness of the frame, or not raised.

A cooler then can be secured simply and easily directly onto the frame using a single bracket and fasteners such as screws. By providing a frame of the shape showing in FIG. 4C, the cooler coldplate makes good direct contact with the top surface of the CPU (i.e., the IHS). Dampeners may be added to the fasteners securing the frame to the motherboard in order to prevent over-torqueing and to control the amount of force a bottom contacting surface of the frame applies to the CPU.\

In some embodiments, a contact frame may include a larger aperture, or be constructed of two, or more, pieces. For example, a first piece can have a shape like the contact frame described above, but with larger aperture and inside this aperture one may use an adapter frame to hold the CPU in position.

Various modifications to the example embodiments will be readily apparent to those skilled in the art, and the generic principles defined herein may be applied to other embodiments and applications without departing from the spirit and scope of the invention. For example, the specifications for a CPU may require a different socket shape, different height restrictions, or different components to be connected. Thus the mounting region may be a different shape, at a difference height, at the same level or even lower than the CPU top surface, etc. requiring modifications to the disclosed structure. Such modifications are clearly contemplated as part of the present invention.

Moreover, in this description, numerous details are set forth for the purpose of explanation. However, one of ordinary skill in the art will realize that the invention may be practiced without the use of these specific details. In other instances, well-known structures and processes are shown in block diagram form in order not to obscure the description of the invention with unnecessary detail. Thus, the present disclosure is not intended to be limited to the embodiments shown, but is to be accorded the widest scope consistent with the principles and features disclosed herein.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

What is claimed is:

1. A contact frame for a cooler used for cooling one or more computer processors, said contact frame comprising:
    a frame body having an aperture therethrough, said aperture being generally rectangular in shape and adapted in size to allow a top portion of a CPU to pass therethrough, said frame body further comprising contact region in a top surface in the region of the aperture, and a mounting region comprising opposing portions t for mounting a cooler above a CPU positioned in said aperture;
    wherein, in an edge region of said aperture on a bottom surface of said frame body, bottom contacting surfaces are provide for applying force on an internal heat spreader (IHS) of a CPU positioned in said aperture;
    wherein, fastening arrangements are provided in said opposing portions for fastening a cooler thereto;
    wherein said frame body includes openings in positions corresponding to openings on a motherboard for installing an integrated loading mechanism (ILM) over a CPU, for securing said frame body in a same position as the ILM would be secured;
    wherein once installed, said frame is adapted to both install a CPU into a socket and to allow a cooler to be mounted thereon without the need for any additional securing means to said motherboard.

2. The contact frame as recited in claim 1, wherein said frame is manufactured by injection molding.

3. The contact frame as recited in claim 1, wherein said frame is manufactured of metal or metal alloy.

4. The contact frame as recited in claim 1, wherein said frame is manufactured of fiber filled plastics.

5. The contact frame as recited in claim 1, wherein said opposing raised portions of said mounting region are cantilevered away from said contact region of said frame.

6. The contact frame as recited in claim 1, wherein said opposing portions of said mounting region have a bottom surface adapted to make contact with a motherboard.

7. The contact frame as recited in claim 5, wherein said opposing raised portions of said mounting region have a bottom surface in the cantilevered portion that does not make contact with a motherboard.

8. A method of installing a contact frame for mounting a cooler to a motherboard used for cooling one or more computer processors, said contact frame for installing a CPU onto the motherboard, said method comprising:
  providing a contact frame according to claim 1;
  removing an integrated loading mechanism (ILM) from said motherboard; and
  installing said contact frame in place of said ILM.

9. The method as recited in claim 8, wherein said frame is manufactured by injection molding.

10. The method as recited in claim 8, wherein said frame is manufactured of aluminum or aluminum alloy.

11. The method as recited in claim 8, wherein said frame is manufactured of fiber filled plastics.

12. The method as recited in claim 8, wherein said opposing raised portions of said mounting region are cantilevered away from said contact region of said frame.

13. The method as recited in claim 8, wherein said opposing raised portions of said mounting region have a bottom surface adapted to make contact with a motherboard.

14. The method as recited in claim 13, wherein said opposing raised portions of said mounting region have a bottom surface in the cantilevered portion that does not make contact with a motherboard.

15. The method as recited in claim 8, wherein said frame is manufactured as a single piece.

16. The method as recited in claim 8, wherein said frame is manufactured as multiple pieces.

17. The contact frame as recited in claim 1, wherein said frame is manufactured as a single piece.

18. The contact frame as recited in claim 9, wherein said frame is manufactured as multiple pieces.

\* \* \* \* \*